(12) United States Patent
Verma et al.

(10) Patent No.: US 9,330,247 B2
(45) Date of Patent: May 3, 2016

(54) APPARATUS AND METHOD FOR MANAGING MULTIPLE USER ACCOUNTS ON A MEMORY CARD

(71) Applicant: The Boeing Company, Chicago, IL (US)

(72) Inventors: Arvin Verma, Naperville, IL (US); Andrew B. Patton, Renton, WA (US)

(73) Assignee: The Boeing Company, Chicago, IL (US)

( * ) Notice: Subject to any disclaimer, the term of this patent is extended or adjusted under 35 U.S.C. 154(b) by 12 days.

(21) Appl. No.: 14/256,139

(22) Filed: Apr. 18, 2014

(65) Prior Publication Data

US 2015/0302187 A1    Oct. 22, 2015

(51) Int. Cl.
*G06F 21/34* (2013.01)
*G06Q 20/34* (2012.01)
*G06F 21/60* (2013.01)

(52) U.S. Cl.
CPC ............... *G06F 21/34* (2013.01); *G06F 21/60* (2013.01); *G06Q 20/3572* (2013.01); *G06Q 20/3574* (2013.01)

(58) Field of Classification Search
CPC . G06Q 20/3572; G06Q 20/3574; G06F 21/60
See application file for complete search history.

(56) References Cited

U.S. PATENT DOCUMENTS

| | | | | |
|---|---|---|---|---|
| 5,649,118 | A * | 7/1997 | Carlisle ................ | G06Q 20/102 705/40 |
| 6,119,020 | A * | 9/2000 | Miller .................... | H04W 88/02 455/410 |
| 6,141,564 | A | 10/2000 | Bruner et al. | |
| 8,196,131 | B1 * | 6/2012 | von Behren .......... | G06Q 20/367 705/64 |
| 2005/0173518 | A1 * | 8/2005 | Takayama ............. | G07F 7/0866 235/380 |
| 2012/0157094 | A1 * | 6/2012 | Cheng ............. | H04M 1/274566 455/433 |
| 2012/0309374 | A1 * | 12/2012 | Tagg ..................... | H04W 4/003 455/418 |
| 2012/0310880 | A1 * | 12/2012 | Giampaolo ....... | G06F 17/30545 707/610 |
| 2013/0205582 | A1 * | 8/2013 | Singh ..................... | H01F 29/02 29/602.1 |
| 2013/0212694 | A1 * | 8/2013 | Castiglia ................ | G06F 21/60 726/26 |
| 2013/0260831 | A1 * | 10/2013 | Uhari .................. | H04M 1/0274 455/558 |
| 2013/0288748 | A1 * | 10/2013 | Korkiakoski .......... | H04W 4/16 455/558 |
| 2014/0053256 | A1 * | 2/2014 | Soffer ..................... | G06F 21/34 726/9 |
| 2015/0033291 | A1 * | 1/2015 | Nicolau ............. | G06Q 20/3278 726/3 |
| 2015/0039905 | A1 * | 2/2015 | Griswold .............. | G06F 21/602 713/190 |

FOREIGN PATENT DOCUMENTS

| | | |
|---|---|---|
| CN | 202980625 | 6/2013 |
| EP | 0983702 | 3/2000 |
| WO | 9853629 | 11/1998 |
| WO | 9927731 | 6/1999 |
| WO | 2013077914 | 5/2013 |

* cited by examiner

*Primary Examiner* — James Turchen
(74) *Attorney, Agent, or Firm* — Perman & Green, LLP

(57) ABSTRACT

A memory card having a memory resident on the memory card and having stored thereon multiple isolated user accounts each having an associated user account data, and a firmware stored in memory, the firmware including coded instructions, which when executed, selectively manages each isolated user account so that an account access data for a predetermined isolated user account is accessed from the associated user account data when the firmware determines a predetermined condition is satisfied.

16 Claims, 8 Drawing Sheets

APPARATUS AND METHOD FOR MANAGING MULTIPLE USER ACCOUNTS ON A MEMORY CARD

BACKGROUND

When looking at the present state of the field of art for subscriber identity module or subscriber identification module (SIM) cards, or Smart Cards (generally referred to as SIM cards), current technology generally limits their use to utilizing one SIM card for authentication purposes. These SIM cards are often used for mobile devices that connect to cellular based networks. These SIM cards are also used for authentication purposes, such as for secure authentication purposes to a network or a personal computer or some other secure device. Generally, the systems using current SIM card technology have several disadvantages. For instance, in situations where the current SIM card technology is used, individuals attempting to access a secure system with multiple user accounts bearing account credentials may find it extremely cumbersome to handle multiple SIM cards in order to obtain access. Similarly, in situations with devices such as, for example, mobile devices, having either one or multiple operating systems may have to accommodate using multiple SIM cards for the different user accounts installed on each SIM card. Currently, there are no existing solutions to simplify such a system.

SUMMARY

Accordingly, the memory card having multiple accounts and the method for managing multiple accounts on the memory card, intended to address the above-identified concerns, would find utility.

In one or more aspects of the present disclosure, a memory card includes a memory resident on the memory card and having stored thereon multiple isolated user accounts each having an associated user account data; and a firmware stored in memory, the firmware including coded instructions, which when executed, selectively manages each isolated user account so that an account access data for a predetermined isolated user account is accessed from the associated user account data when the firmware determines a predetermined condition is satisfied.

In one or more aspects of the present disclosure, a method for managing user accounts includes storing multiple isolated user accounts in a memory resident on a memory card where each user account has an associated user account data; executing coded instructions of a firmware stored in memory to selectively manage each isolated user account; and enabling access to an account access data for a predetermined isolated user account from the associated user account data when the firmware determines a predetermined condition is satisfied.

In one or more aspects of the present disclosure, a multiple account smart card, configured to interface with a reader in communication with a secure access system, includes a memory resident on the multiple account smart card and having stored thereon multiple isolated user accounts each having an associated user account data; and a firmware stored in memory, the firmware including coded instructions, which when executed, selectively manages each isolated user account so that an account access data for a predetermined isolated user account is accessed from the associated user account data when the firmware determines an account credential verification is satisfied; and wherein the firmware effects account credential verification in response to an access request from the secure access system and directs access by the secure access system to a predetermined isolated user account based on a tag associated with the predetermined isolated user account.

In one or more aspects of the present disclosure, a secure access system includes a secure access device having a reader, and a multiple account smart card configured to interface with the reader, the multiple account smart card including a memory resident on the multiple account smart card having stored thereon multiple isolated user accounts each having an associated user account data, and a firmware stored in memory, the firmware including coded instructions, which when executed, selectively manages each isolated user account so that an account access data for a predetermined isolated user account is accessed from the associated user account data when the firmware determines an account credential verification is satisfied, and wherein the firmware effects account credential verification in response to an access request from the secure access device and directs access by the secure access device to a predetermined isolated user account based on a tag associated with the predetermined isolated user account.

BRIEF DESCRIPTION OF THE DRAWINGS

Figure 1:
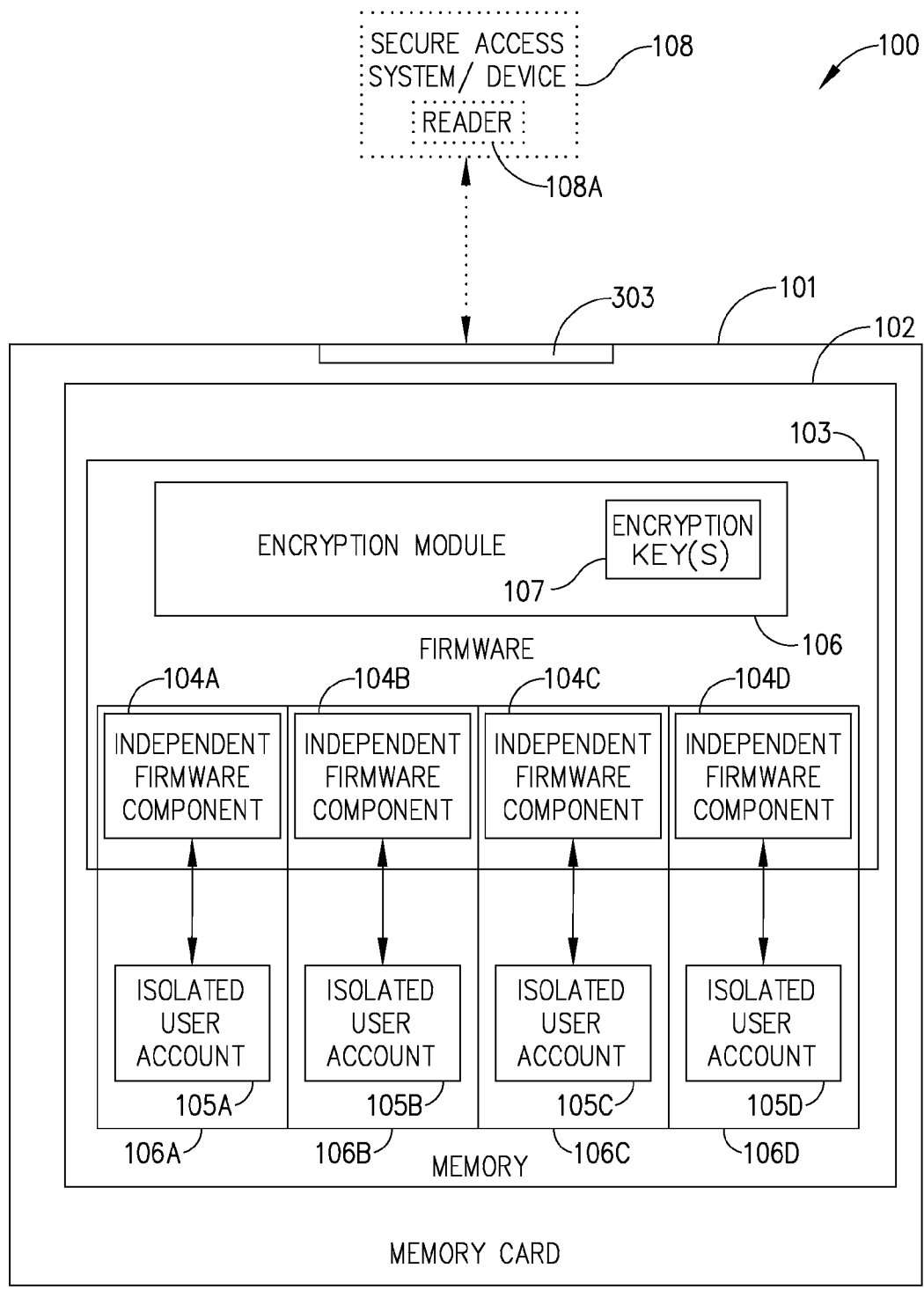
Figure 1A:
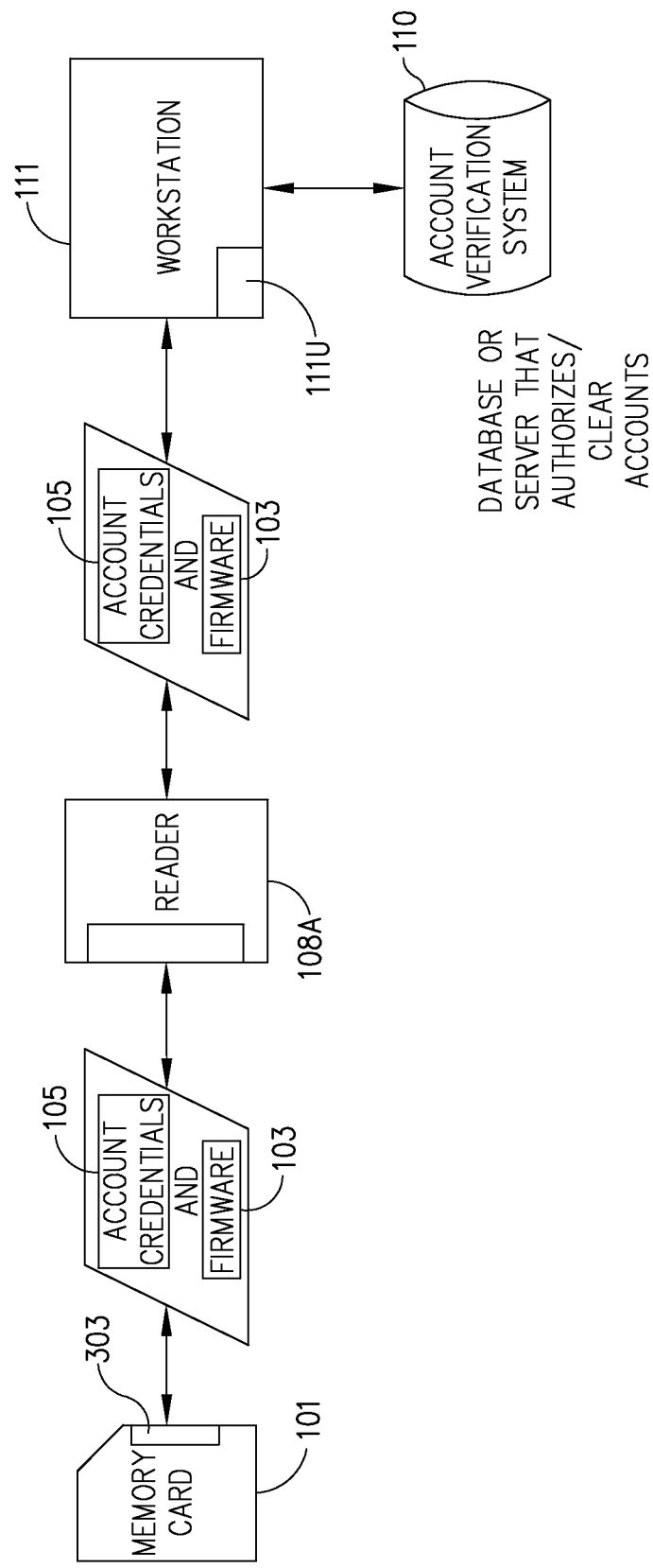
Figure 2:
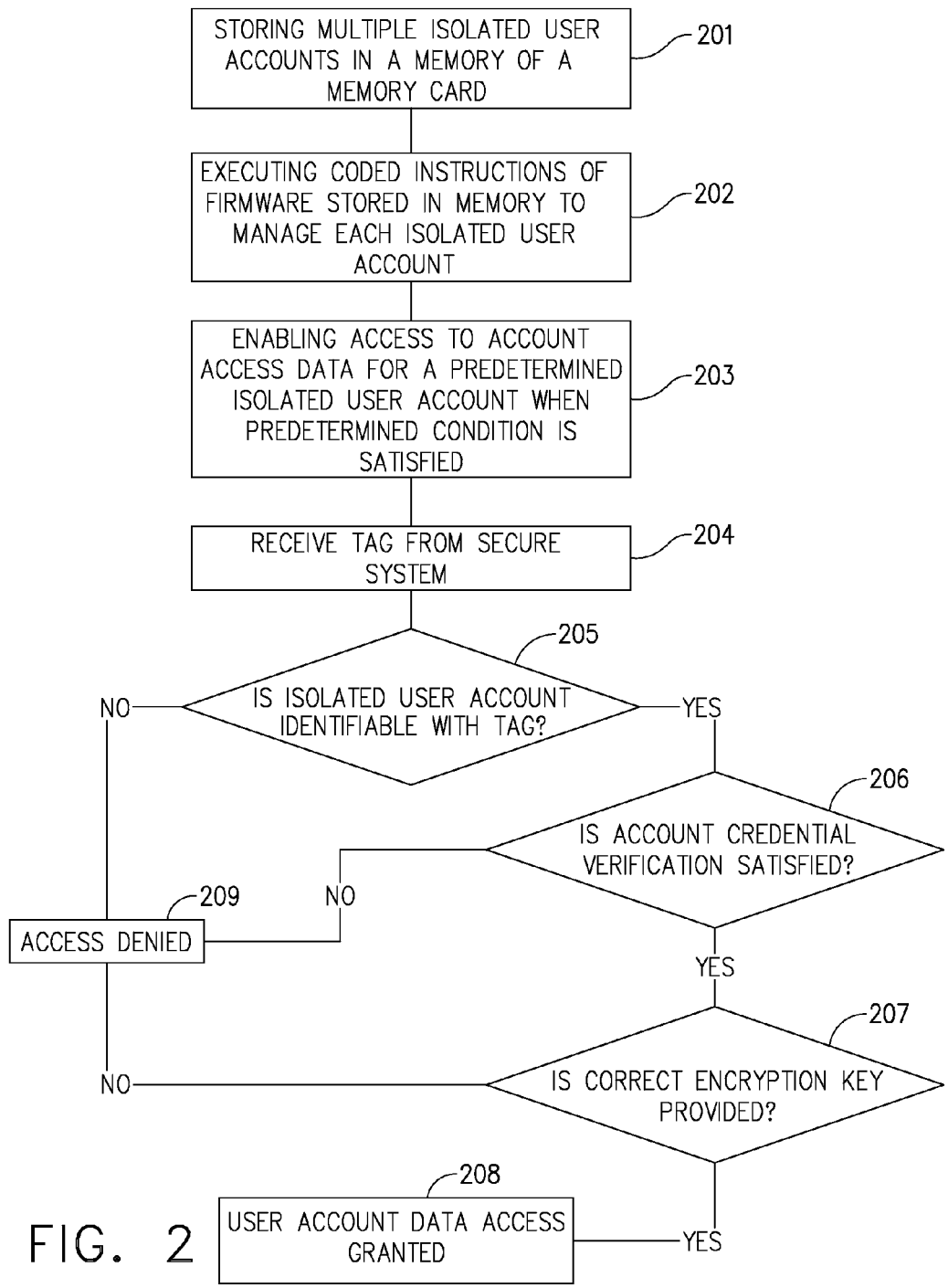
Figure 2A:
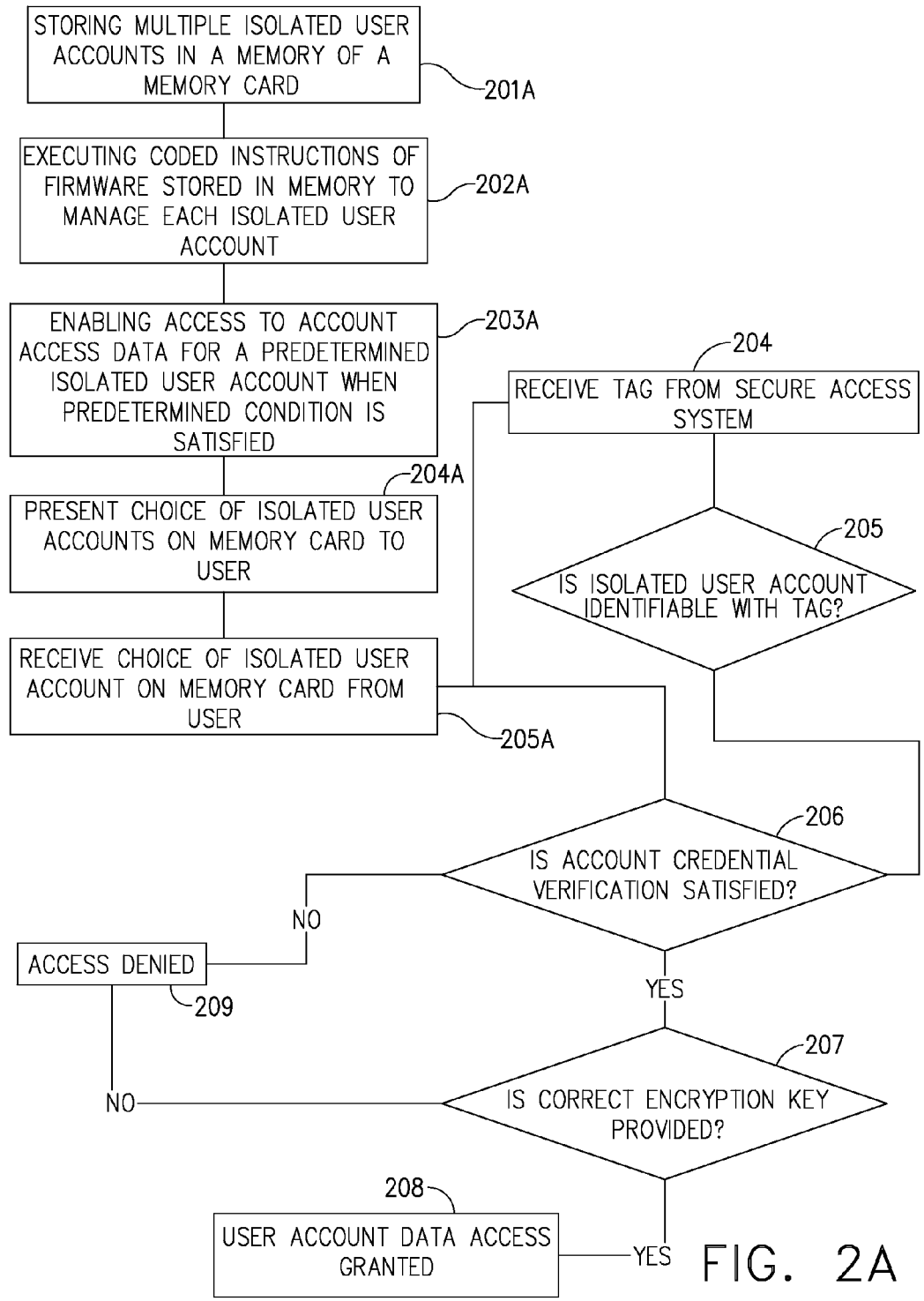
Figure 3:
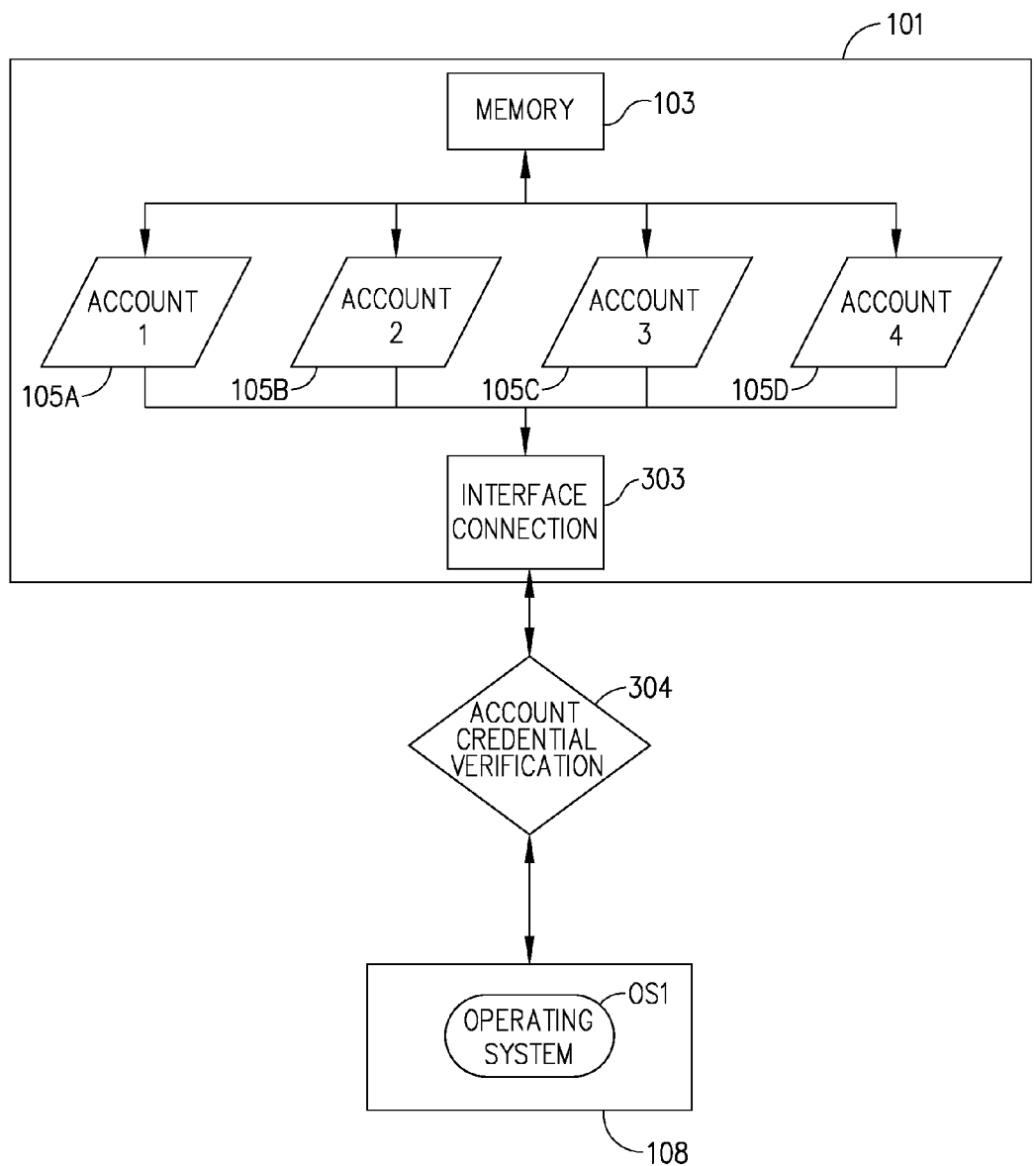
Figure 4:
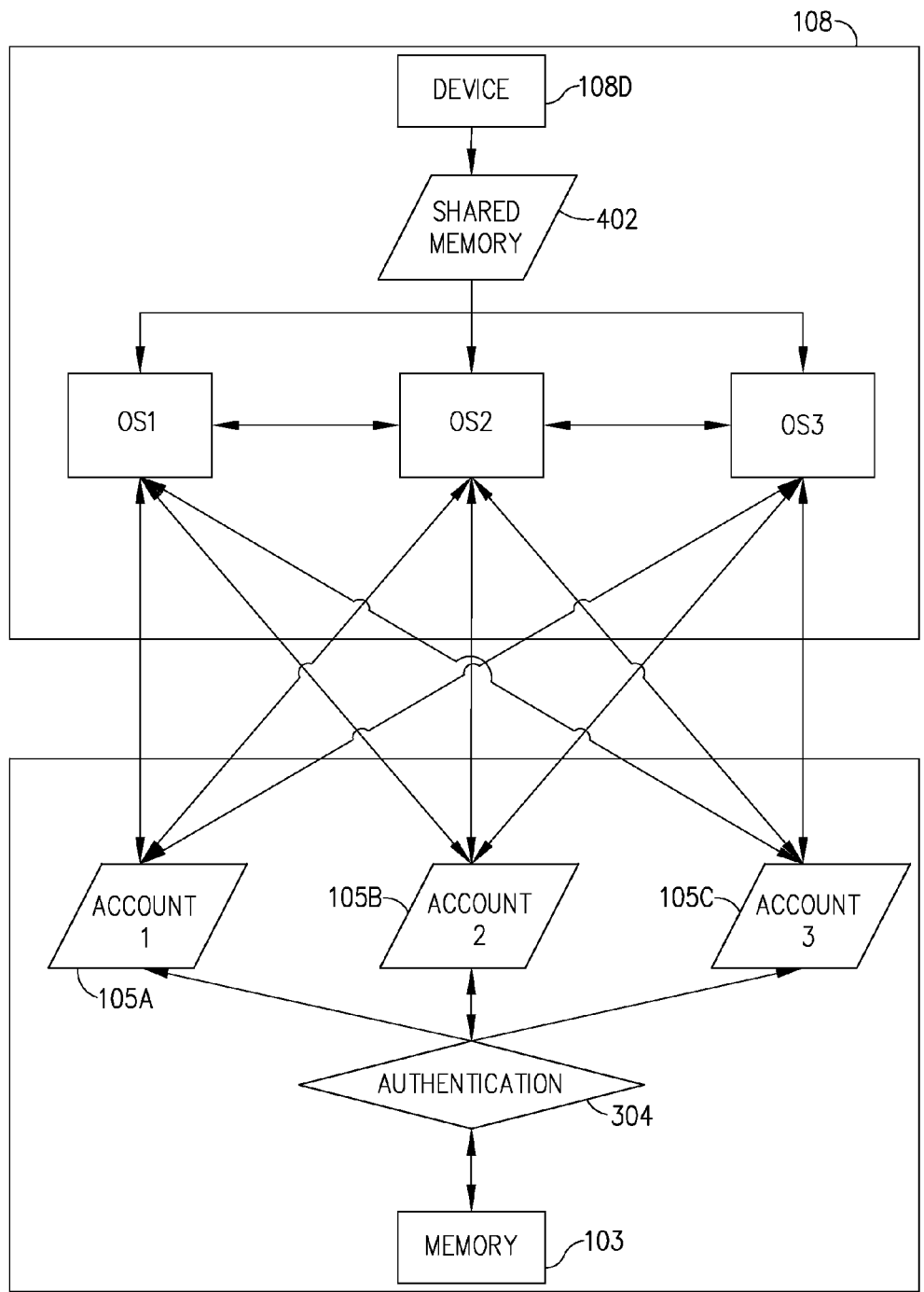
Figure 5:
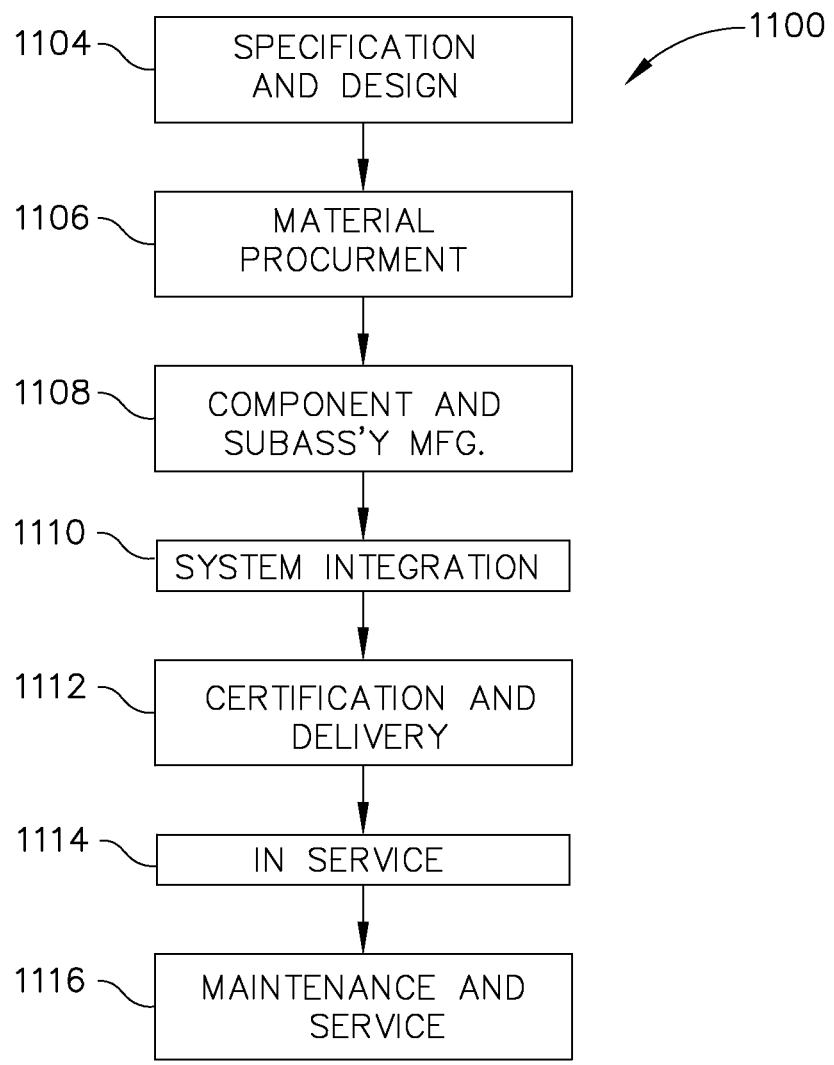
Figure 6:
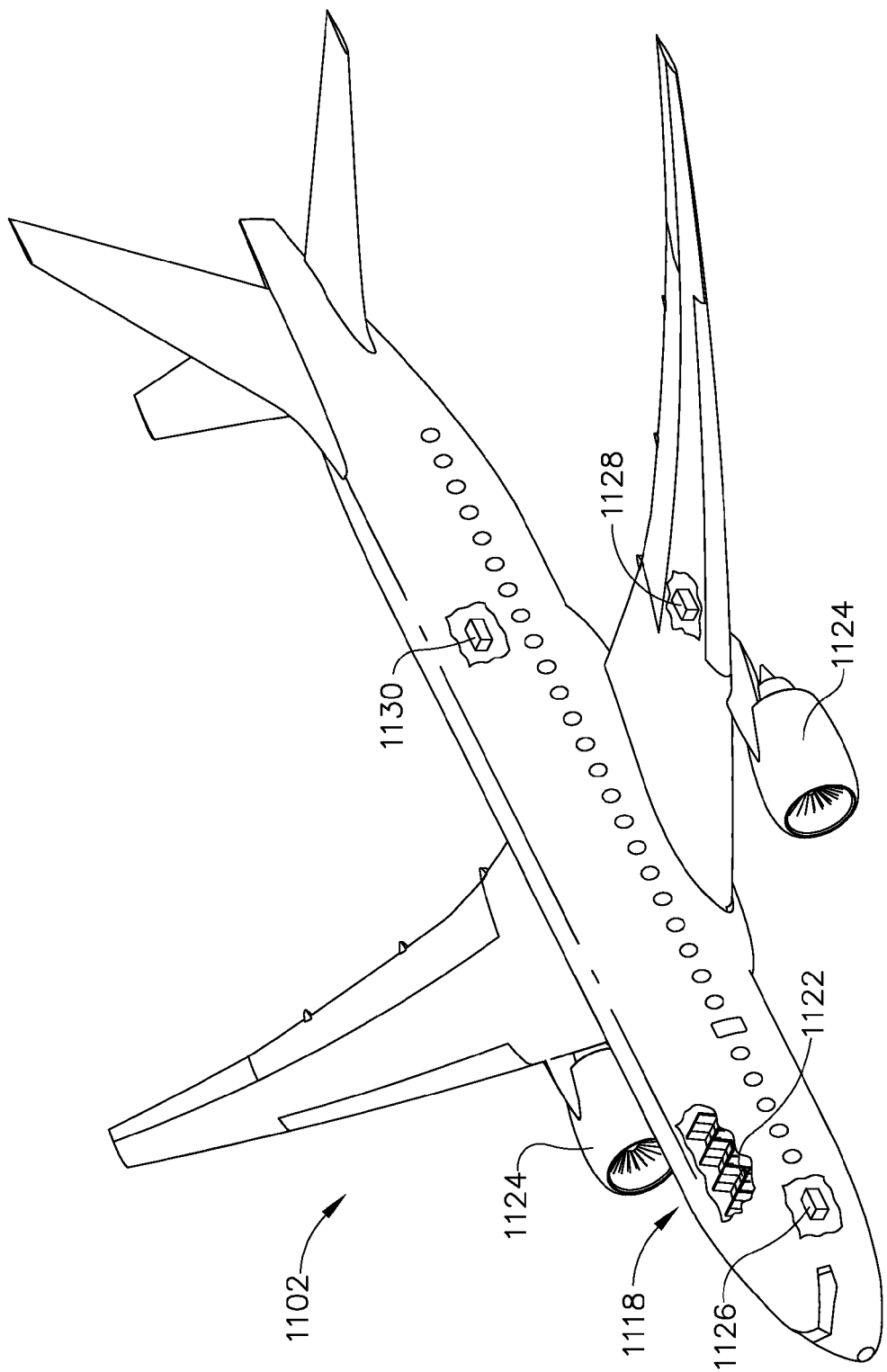

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of an exemplary memory card according to aspects of the present disclosure;

FIG. 1A is an exemplary block diagram illustrating a situational example of a memory card operation, according to aspects of the present disclosure;

FIG. 2 is an exemplary flow chart of managing user accounts, according to aspects of the present disclosure;

FIG. 2A is an exemplary flow chart of managing user accounts, according to aspects of the present disclosure;

FIG. 3 is an exemplary block diagram illustrating a situational example of a memory card operation, according to aspects of the present disclosure;

FIG. 4 is an exemplary block diagram illustrating a situational example of a memory card operation, according to aspects of the present disclosure;

FIG. 5 is a flow diagram of aircraft production and service methodology;

FIG. 6 is a schematic illustration of an aircraft.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

It would be advantageous to have a system which can solve the issue of having multiple SIM cards with different accounts by having all of the various user account information compiled on a single memory card instead of having multiple memory cards. For example, the consolidation of multiple user account information on one memory card may result in reduced cost of having multiple memory cards and may provide easier management of multiple secure access accounts without having to replace memory cards every time a different account is accessed. Users with multiple secure access accounts/phones may also see the benefit of carrying one memory card for multiple secure access accounts as this may reduce a number of phones carried by the user to a single phone. In a military context, multiple secure access accounts corresponding to different levels of security may be consolidated to only one memory card. The system may be utilized in a mobile environment but can also be used across multiple secure access accounts. For the purposes of this application, the terms "SIM card," "smart card," "secure access cards" and "memory card" are used interchangeably to refer to a memory card having multiple secure access accounts within.

Referring to FIG. 1, one example of the present disclosure relates to a system 100 having a memory card 101 and a secure access system/device 108 (generally referred to as secure access system 108), where the memory card 101 includes multiple secure access accounts 105A-105D within. The memory card 101 may be employed in a secure access system 108. The secure access system 108 may be a system which may access the secure access account information stored within the memory card 101 to grant a user access to certain accounts or features of the secure access system 108. For example, the user access may include access to certain networks, databases or any other suitable secure systems. The secure access system 108 may include any suitable reader 108A configured to interface with the memory card 101 via an interface connection 303. The reader 108A may take the form of a memory card reader, such as, but not limited to, a SIM card reader or a smart card reader, a wireless reader (e.g., a near field communication (NFC) reader) or any suitable device which is capable of reading a memory card that is physically interfaced with the device or wirelessly connected to the device. The secure access system 108 may be able to receive secured user account data from the memory card 101 including secured user account data. The secure access system 108 may take the form of a mobile device, for instance, a smart phone which takes SIM cards. However, in other aspects, the secure access system 108 may be any other suitable device including a desktop computer or a laptop computer that works with an identity access management system on a company network to provide secure access credential verification. In yet other aspects, the secure access system 108 may be a component of an aerospace, automotive or maritime vehicle or a component or system included during the production of the aerospace, automotive or maritime vehicles. In other aspects, the secure access system 108 may also be integrated into parts of buildings, such as manufacturing and/or design facilities or any other suitable systems (e.g. security systems/access systems) of any suitable facility. The secure access system 108 may have identity access management capabilities responsible for identifying secured user accounts on the memory card 101. This may be accomplished by the secure access system 108 communicating a request to the memory card 101 as will be discussed below.

Referring still to FIG. 1, the secure access system 108 is in communication with a memory card 101. The memory card 101 may be in the form of a SIM card, or, in other aspects, may take the form of a smart card, a secure access card or any other suitable memory card or device capable of storing and providing access to user account information as described herein. The memory card 101 may have any suitable memory 102 resident thereon. In one aspect of the disclosed embodiment, the memory can be read only memory (ROM), but in other aspects of the disclosed embodiment, any suitable memory for storing information such as user account credentials may be employed. For example, in one aspect, the memory card 101 may be read only (accounts are loaded only one time) for a particular project. In another aspect, the memory card 101 may have read and write access where only an administrator can change account credentials (or even a user, based on the security use policy of the entity using the card). This may allow for greater flexibility and security controls when needed as defined by predetermined security requirements. This may also prevent any login data from being used in any unintended way. A number of isolated user accounts 105A-105D may be stored in the memory 102. Each isolated user account 105A-105D may include user account data. The user account data may be in the form of one or more of security certificates or tokens stored within the user account data. The isolated user accounts 105A-105D may be stored in the memory 102 in a substantially isolated manner such that each isolated user account 105A-105D is separate from every other isolated user account 105A-105D. For example, the memory 102 may include partitioning to isolate or otherwise separate each isolated user account 105A-105D. In one aspect, the memory 102 may be divided into any suitable number of partitions 106A-106D having any suitable arrangement (e.g. size), however the size and number of partitions 106A-106D may be dependent on a memory capacity of the memory card 101. It should be noted that in addition to being isolated in the memory 102, the isolated user accounts 105A-105D may further be encrypted such that each isolated user account 105A-105D may not be read directly from the memory 102. Each isolated user account 105A-105D may also be associated with a tag or an identifier as will be described below.

Referring still to FIG. 1, the memory 101 may include firmware 103. The firmware 103 may include coded instructions which, when executed, selectively manages each isolated user account 105A-105D. The firmware 103 may serve as a primary point of contact between the isolated user accounts 105A-105D and the secure access system 108. The firmware 103 may be considered as a gatekeeper when managing each of the isolated user accounts 105A-105D so that, when working with various authentication systems of the secure access system 108, the firmware 103 may grant access to specific user account data in the isolated user accounts 105A-105D to the secure access system 108. The firmware 103 may include an encryption module 106 having one or more encryption key(s) 107. The encryption module 106 may be employed in such a way that when a predetermined isolated user account 105A-105D is identified by the secure access system 108, the firmware 103 is configured to use the encryption module 106 and the one or more encryption key(s) 107 to decrypt the contents of the predetermined isolated user account 105A-105D and return, for example, user account data corresponding to the predetermined isolated user account 105A-105D, in the form of a security certificate or token or in any other form, to the secure access system 108.

In addition to the encryption module 106 and encryption key 107, the firmware 103 may also have independent firmware components 104A-104D that may correspond to a respective isolated user account 105A-105D. The independent firmware components 104A-104D may allow for different encryption types to be applied for each isolated user account 105A-105D. In this case, each isolated user account 105A-105D may employ a different encryption type through the independent firmware component 104A-104D such that, for example, isolated user account 105A and independent firmware component 104A may employ a first type of encryption, isolated user account 105B and independent firmware component 104B may employ a second type of encryption and so on, such that at least the first type of encryption is different than the second type of encryption. The independent firmware component 104A-104D and the respective different encryption types may be managed in any suitable manner such as by a Public Key Infrastructure system (PKI) along with identity access management systems.

Referring still to FIG. 1, firmware 103 may be employed to determine which of the isolated user accounts 105A-105D matches a request by the secure access system 108. The firmware 103 may determine which account is being requested based on one or more of a tag-based system and a user selection based system. In the tag-based system, each isolated user account 105A-105D includes a tag that identifies the isolated user account 105A-105D. The secure access system 108 may send a request including a request tag to firmware 102. The tags of the tag-based system will be described in greater detail below. The firmware 102 may identify an isolated user account 105A-105D that has a tag associated with the isolated user account 105A-105D that matches the request tag sent by the secure access system 108. If an isolated user account 105A-105D with an associated tag matching the request tag sent by the secure system 108 is found on the memory card 101, then the account is selected by the firmware 103 and the user is prompted for account credential verification. In other aspects, a user may manually select one of the isolated user accounts 105A-105D on the memory card 101 through any suitable user interface. This manual selection, in one aspect, may not require tags because the user may select an isolated user account 105A-105D based on a label associated with each isolated user account 105A-105D when the isolated user account 105A-105D was loaded onto the memory card 101. A possible use case for this may be based on the sensitivity of the data being accessed. In the case of an extremely sensitive data system, a manual verification may be employed instead of automatic, to prevent unauthorized access in both physical and logical aspects. In other aspects, manual selection of an isolated user account 105A-105D may include tags such that an account is selected on the user interface and a request tag is sent to the firmware 103 in the manner described herein to be matched with a tag associated with an isolated user account 105A-105D. When the user selects the isolated user account 105A-105D and the account is found on the memory card 101, then the user is prompted for account credential verification.

Referring now to FIG. 1A, a situational example is provided for loading firmware 103 data and isolated user account 105 data onto the memory 102 of the memory card 101 according to an aspect of the disclosed embodiment. A user or an account administrator may interface the memory card 101 with a suitable reader such as reader 108A described above through the interface connection 303. In one aspect, the reader 108A may be configured to read and write to the memory 102 of the memory card 101. The reader 108A may further be communicably connected to any suitable workstation 111, which, in turn may communicate with an account verification system 110. The workstation 111 may be any suitable computing device such as a desktop computer, laptop computer, dedicated card reader/writer device or any other device configured to read from and write to the memory card 101. In one aspect, the workstation 111 may be a part of the secure access system 108. When the memory card 101 is interfaced with the reader 108A, the workstation 111 may read the memory 102 of the memory card 101 to verify that the memory card 101 is authentic. If the memory card 101 is determined to be authentic by the workstation 111, a user or administrator may see a prompt on a user interface 111U of the workstation 111 which may direct them to select user account credentials from a listing of user accounts available on the workstation 111, which may be verified according to the account verification system 110. When the user or administrator selects a predetermined user account, the user interface 111U of the workstation 111 may further present the user or administrator with the option to "upload" the selected user account data (which may correspond to the type of data stored in an isolated user account 105) to the memory 102 of the memory card 101. When this option is selected, the workstation 111 may use the reader 108A to upload the user account data associated with the selected user account to the memory card 101 in the form of an isolated user account 105A-D. The workstation 111 may also update the tags associated with the isolated user account 105A-D on the memory card 101 through the reader 108A. In one aspect, the workstation 111 may also upload or update the firmware 103 and any independent firmware components 104A-D associated with the isolated user account 105A-D which may be used to read an isolated user account's 105A-D tags. As a logical and physical security control, in one aspect, once the memory card 101 is verified as authentic and a user account is selected by a user or administrator, that selected user account may no longer be loaded on any other memory cards 101. In other aspects, in a manual process, as may be described further below, tags may not be updated with the upload operation. When the upload operation is completed, the memory card 101 may be issued or reissued to a user.

In one aspect, the credentials used in the user account data may be derived from any suitable source where a company creates and stores their security certificates, tokens and any other suitable authentication components. Further, based on the role of the user's job or security level, the types of user accounts that may be used with the memory card 101 may be different. The memory card 101 may be loaded once or may be loaded multiple times. The workstation 111 may also have additional administrative functions available to it. For example, basic administrative functions may include removing, modifying and setting the partition requirements may be effected when the memory card 101 is interfaced with the workstation 111. Where the memory card 101 is not available (i.e. if it has been lost or destroyed), user account credentials may be suspended or deactivated by the account verification system 110.

Referring now to FIG. 2, an exemplary flowchart for an automated management of user accounts is shown where "automated" may refer to an automatic account selection upon interfacing of the memory card 101 with secure access system 108. At block 201, multiple isolated user accounts 105A-105D are stored in the memory 102 of a memory card 101. As noted above, these isolated user accounts 105A-105B may be isolated from each other through memory partitioning. In one aspect, memory space of the memory 102 associated with the isolated user accounts 105A-105D may be partitioned by the firmware 103 of the memory card 101 or in any other suitable manner. At block 202, the coded instructions of the firmware 103 (which may reside in the independent firmware components 104A-104D) stored in the memory 102 are executed to manage each isolated user account 105A-105D. The firmware 103 may be configured to provide for communication with all isolated user accounts 105A-105D and serve as a primary point of contact between the isolated user accounts 105A-105D and the secure access system 108. At block 203, the firmware 103 may enable access to account access data of an isolated user account 105A-105D when a predetermined condition is satisfied. Enabling access of block 203 may be described as follows. At block 204, the firmware 103 may receive the request tag from the secure access system 108 requesting access to a predetermined isolated user account 105A-105D. As noted previously, the isolated user accounts 105A-105D may be identified by tags that are attached to each isolated user account 105A-105D. The firmware 103 may receive the request tag from the secure access system 108 which may correspond to the tag associated with one of the isolated user accounts 105A-105D. As previously noted, these tags may be, for instance, comprised of a sequence of alphanumeric characters or any other identifier unique to a respective isolated user account 105A-105D. In other aspects, the tags may use existing system names or keys for the isolated user account 105A-105D. In yet other aspects, for security purposes, the tags may also be randomly generated such that the secure access system 108 and, for example, the firmware 103 or each independent firmware component 104A-104D may be synchronized in any suitable manner to generate matching tags. In other aspects, the tags may also be cyphered or encrypted so that in the case of a security breach, isolated user accounts 105A-105D cannot be identified unless the right cypher is available to decrypt the tag associated with the isolated user account 105A-105D. When a memory card 101 is interfaced with a secure access system 108, the secure access system 108 may generate a request tag for a predetermined isolated user account 105A-105D and send it to the firmware 103. In other aspects, the request tag may be generated in any suitable manner such as by a user selection of an isolated user account 105A-105D. When the firmware 103 receives the request tag from the secure access system 108, the firmware 103 determines whether there is an isolated user account 105A-105D in the memory 102 with an associated tag that matches the request tag (see block 205). If there is an isolated user account 105A-105D that has an associated tag that matches the request tag (see block 205), then the flow proceeds to block 206 and the firmware 103 informs the secure access system 108 that the isolated user account 105A-105D with the matching associated tag is what the secure access system 108 should validate from. If, however, there is no isolated user account 105A-105D with an associated tag that matches the request tag, then the flow proceeds to block 209, where access to the secure access system 108 is blocked. In this case, the user does not have the requisite credentials on the memory card 101 to access the secure access system 108. At block 206, the firmware 103 may be further configured to determine if an account credential verification is satisfied. The account credential verification may be performed by, for example, the user entering a password, a pin number or any other suitable account credential verification action (for example, a visual password). If the account credential verification is successful (i.e. if the password, pin or other account credential verification was accepted), then the flow proceeds to block 207. If, however, the account credential verification is unsuccessful (i.e. if the password, pin or other account verification action was not accepted), then the flow may proceed to block 209, where access to the secure access system 108 is denied. In one aspect of the disclosed embodiment, a user may receive more than one attempt at correctly completing the account credential verification action to eliminate accidental system lock out due to, for example, a typographical error. However, the number of attempts may be limited by an administrator, for instance, a user may enter a password or a pin number three times (based on the organization's security policy), but if these are not accepted, then the secure access system 108 may deny the user access (i.e. block 209). At block 207, once an account credential verification action is satisfied, the firmware 103 may determine if the proper encryption key is provided. If the encryption key provided does not correspond to the encryption key 107 associated with the isolated user account 105A-105D for which access is requested, then the secure access system 108 may deny the user access (i.e. block 209). The user may be provided more than one attempt to provide the right encryption key before the secure access system 108 denies the user access at block 209. If the encryption key provided corresponds to the encryption key 107 associated with the isolated user account 105A-105D for which access is requested, then the flow proceeds to block 208, and access is granted to the secure access system 108 to access account information in the isolated user account 105A-105D. As may be realized, once the credentials have cleared for the secure access system 108 to read the isolated user account(s) 105A-105D on the memory card 101, the firmware 103 may again manage communications between the secure access system 108 and the isolated user account(s) 105A-105D. This may comprise, for example, of a request being sent out by the secure access system 108 requesting access. This may also comprise of an existing request that cleared the credential verification check. A tag request may be sent from the secure access system 108 and the firmware may identify the request and route the request to the right credentials stored on the memory card 101.

Referring now to FIG. 2A, another exemplary flowchart for a manual management of isolated user accounts 105A-105D is shown. The blocks of the flowchart illustrated in FIG. 2A may substantially correspond with their counterpart blocks illustrated in FIG. 2 except as noted. At block 201A, multiple isolated user accounts 105A-105D are stored in the memory 102 of a memory card 101. At block 202A, the coded instructions of the firmware 103 stored in the memory 102 are executed to manage each isolated user account 105A-105D. The firmware 103 may be configured to provide for communication with all isolated user accounts 105A-105D and serve as a primary point of contact between the isolated user accounts 105A-105D and a secure access system 108. At block 203A, the firmware 103 may enable access to account access data of an isolated user account 105A-105D when a predetermined condition is satisfied. Enabling access of block 203A may be described as follows. At block 204A, account selections may be presented by the secure access system 108 on the user interface. In one aspect, the firmware 103 may present a choice of the isolated user accounts 104 stored in the memory card 101. This may be presented, for instance, via a user interface of the secure access system 108. However, in other aspects, the choice of isolated user accounts 104 stored on the memory card 101 may be presented in any suitable manner. The choice of isolated user accounts 104 may be presented through data received by the secure access system 108 from the firmware 103. The isolated user accounts 105A-105D may be identified by any suitable identifier, such as the tags described herein, attached to each isolated user account 105A-105D so that a user may recognize and choose the correct isolated user account 104 when presented with a choice of isolated user accounts 105A-105D. In one aspect, the secure access system 108 may include a predefined set of isolated user account identifier(s) to be selected by a user. This predetermined set of isolated user account identifier(s) may or may not correspond to the isolated user account(s) 105A-105D on the memory card 101. If the isolated user account identifier(s) of the secure access system 108 correspond to the isolated user account(s) 105A-105D on the memory card 101, then the correct card for that secure access system 108 has been entered and verification proceeds through a user selection of an isolated user account 105A-105D (block 205A). If the isolated user account identifier(s) of the secure access system 108 do not correspond to the isolated user account(s) on the memory card 101, then access is not granted. As noted above, in one aspect, tags may not be used as the selection of the isolated user account(s) is presented and selected by a user and account credential verification may proceed as described above with respect to blocks 206-209. In another aspect, the user may select an account from the user interface and the tag is sent and account credentials are verified in the manner described above with respect to blocks 204-209.

Referring now to FIG. 3, a situational example is provided of a multiple account memory card 101 interfacing with a secure access system 108 having a single operating system OS1. As noted above, the memory card 101 may include multiple user accounts 105A-105D. The memory card 101 may include any suitable interface connection 303 configured to mechanically, electrically or wirelessly interface the memory card 101 to the secure access system 108. The isolated user account(s) 105A-105D may be accessed as described above where block 304 represents the account verification described above with respect to one or more of FIGS. 2 and 2A.

Referring now to FIG. 4, a situational example is provided of a multiple account memory card 101 interfacing with a device 108D of the secure access system 108 where the device 108D includes multiple operating systems OS1, OS2 and OS3. The device 108D may be a personal computer, laptop computer, tablet, mobile device, phone or any other secure access device such as a device incorporated in any suitable vehicle or facility. In some aspects, the physical device 108D may be an aerospace, maritime or automotive vehicle systems component or a system used in the manufacture of aerospace, maritime or automotive vehicles. The device 108D may have a shared memory 402 which may include the multiple operating systems OS1, OS2 and OS3. For illustration purposes, three operating systems OS1, OS2 and OS3 are shown in FIG. 4, but in other aspects any suitable number of operating systems may be provided. Each operating system OS1, OS2 and OS3 may be able to access one or more user accounts 105A-105C of the memory card 101. The memory card 101 is shown with three isolated user account(s) 105A-105C, but in other aspects, the memory card may have any suitable number of isolated user accounts. Each of the operating systems OS1, OS2 and OS3 may request access to one or more of the isolated user accounts 105A-105C in a manner substantially similar to that described above where block 304 represents verification as described with respect to FIGS. 2 and 2A.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 5 and an aircraft 1102 as shown in FIG. 6. Specifically, the aspects of the memory card 101 described herein may be included, for instance, in any stage of aircraft manufacturing and service method where a secure access may be employed to access certain systems or areas of buildings, vehicles or any other suitable systems. For example, the memory card 101 may provide access to design and/or manufacturing facilities, design programs such as computer aided design (CAD) programs, vehicle cockpits or control systems, devices such as personal computers, laptop computers, mobile phones, mobile devices or any other suitable devices. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, the aircraft 1102 produced by the illustrative method 100 may include an airframe 1118 with a plurality of high-level systems and an interior 1122. Examples of high-level systems include one or more of a propulsion system 1124, an electrical system 1126, a hydraulic system 1128, and an environmental system 1130. Any number of other systems may be included. The aircraft 1102 may employ many systems which may use the system for secure access using a memory card having multiple accounts. Although an aerospace example is shown, the principles of the invention may be applied to other industries, such as the automotive and maritime industries.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

In one or more aspects of the present disclosure, a memory card having a memory resident on the memory card and having stored thereon multiple isolated user accounts each having an associated user account data, and a firmware stored in memory, the firmware including coded instructions, which when executed, selectively manages each isolated user account so that an account access data for a predetermined isolated user account is accessed from the associated user account data when the firmware determines a predetermined condition is satisfied.

In one or more aspects of the present disclosure, wherein each user account resides in a respective partition in the memory and the firmware includes encryption that effects communication with the respective partitions.

In one or more aspects of the present disclosure, wherein the firmware includes at least one encryption key effecting access to the associated user account data for a predetermined isolated user account upon satisfying the predetermined condition.

In one or more aspects of the present disclosure, wherein the firmware includes independent firmware components associated with each of the multiple isolated user accounts.

In one or more aspects of the present disclosure, wherein the independent firmware components effect association of a first type of encryption with at least one of the multiple isolated user accounts that is different from a second type of encryption associated with another one of the multiple isolated user accounts.

In one or more aspects of the present disclosure, wherein each isolated user account is associated with a tag, the firmware further having coded instructions to parse information related to a predetermined tag from an account access request from a secure access system to identify an isolated user account associated with the predetermined tag.

In one or more aspects of the present disclosure, wherein the predetermined condition is account credential verification.

In one or more aspects of the present disclosure, wherein the firmware includes encoded instructions to effect account credential verification in response to an access request from a secured system where the firmware directs the secured system to access an isolated user account based on a tag associated with the isolated user account.

In one or more aspects of the present disclosure, wherein the firmware includes coded instructions to block access to the isolated user account when incorrect account credentials are provided by a user.

In one or more aspects of the present disclosure, wherein the firmware includes coded instructions to block access to the isolated user account when a secure access system includes an incorrect encryption key.

In one or more aspects of the present disclosure, the memory card is configured to interface with one or more of an aerospace vehicle and a subsystem of the aerospace vehicle.

In one or more aspects of the present disclosure, the memory card is configured to interface with one or more of building facility systems, vehicle systems, personal computers, laptop computers, mobile phones and mobile devices.

In one or more aspects of the present disclosure, a method for managing user accounts, includes storing multiple isolated user accounts in a memory resident on a memory card where each user account has an associated user account data, executing coded instructions of a firmware stored in memory to selectively manage each isolated user account, and enabling access to an account access data for a predetermined isolated user account from the associated user account data when the firmware determines a predetermined condition is satisfied.

In one or more aspects of the present disclosure, the method further includes editing and removing the multiple isolated user accounts in the memory resident on the memory card where each user account has associated user account data.

In one or more aspects of the present disclosure, the method further includes modifying a partition space of the memory resident on the memory card where the multiple isolated user accounts are stored.

In one or more aspects of the present disclosure, the method further includes storing the multiple isolated user accounts in a respective partition in the memory and effecting communication with the respective partitions with encryption of the firmware.

In one or more aspects of the present disclosure, the method further includes effecting access to the user account data for a predetermined isolated user account with at least one encryption key of the firmware upon satisfying the predetermined condition.

In one or more aspects of the present disclosure, the method further includes associating independent firmware components with each of the multiple isolated user accounts within the firmware.

In one or more aspects of the present disclosure, the method further includes effecting association of a first type of encryption with at least one of the multiple isolated user accounts that is different from a second type of encryption associated with another one of the multiple isolated user accounts with the independent firmware components.

In one or more aspects of the present disclosure, the method further includes associating each isolated user account with a tag and parsing information related to a predetermined tag from an account access request with the firmware to identify an isolated user account associated with the predetermined tag.

In one or more aspects of the present disclosure, the method further includes verifying an account credential as part of the predetermined condition.

In one or more aspects of the present disclosure, the method further includes effecting account credential verification with coded instructions included in the firmware in response to an access request from a secure system where the firmware directs the secure system to access an isolated user account based on a tag associated with the isolated user account.

In one or more aspects of the present disclosure, a multiple account smart card configured to be inserted into a reader in communication with a secure access system, the multiple account smart card having a memory resident on the multiple account smart card and having stored thereon multiple isolated user accounts each having an associated user account data, and a firmware stored in memory, the firmware including coded instructions, which when executed, selectively manages each isolated user account so that an account access data for a predetermined isolated user account is accessed from the associated user account data when the firmware determines an account credential verification is satisfied, and wherein the firmware effects account credential verification in response to an access request from the secure access system and directs access by the secure access system to a predetermined isolated user account based on a tag associated with the predetermined isolated user account.

In one or more aspects of the present disclosure, wherein each isolated user account resides in a respective partition in the memory and the firmware includes encryption that effects communication between the respective partitions.

In one or more aspects of the present disclosure, a secure access system includes a secure access device having a reader, and a multiple account smart card configured to interface with the reader, the multiple account smart card including a memory resident on the multiple account smart card and having stored thereon multiple isolated user accounts each having an associated user account data, and a firmware stored in memory, the firmware including coded instructions, which when executed, selectively manages each isolated user account so that an account access data for a predetermined isolated user account is accessed from the associated user account data when the firmware determines an account credential verification is satisfied, and wherein the firmware effects account credential verification in response to an access request from the secure access device and directs access by the secure access device to a predetermined isolated user account based on a tag associated with the predetermined isolated user account.

In one or more aspects of the present disclosure, the secure access system is configured to interface with one or more of an aerospace vehicle and a subsystem of the aerospace vehicle.

In one or more aspects of the present disclosure, the secure access system is configured to interface with one or more of building facility systems, vehicle systems, personal computers, laptop computers, mobile phones and mobile devices.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A memory card comprising:
a memory resident on the memory card and having stored thereon multiple isolated user accounts each having an associated user account data; and
a firmware stored in a permanent portion of the memory, the firmware including one or more stored encryption keys, each corresponding to one of the multiple isolated user accounts, the firmware further including coded instructions, which when executed, selectively manages each isolated user account so that an account access data for a predetermined isolated user account is accessed from the associated user account data when the firmware determines an account credential verification is satisfied where the firmware interfaces with a secure access system to receive a communication from the secure access system and functions to determine when a tag information within the communication from the secure access system that is requesting authentication matches a tag associated with one of the multiple isolated user accounts and further determine when an encryption key within the communication from the secure access system matches the stored encrypted key corresponding to the one of the multiple isolated user accounts, wherein the firmware includes independent firmware components associated with each of the multiple isolated user accounts, each isolated user account employing an encryption type based on the independent firmware component.

2. The memory card of claim 1, wherein each user account resides in a respective partition in the memory and the firmware includes encryption that effects communication with the respective partitions.

3. The memory card of claim 1, wherein the firmware includes at least one encryption key effecting access to the associated user account data for the predetermined isolated user account upon satisfying the predetermined condition.

4. The memory card of claim 1, wherein each isolated user account is associated with a tag, the firmware further having coded instructions to parse information related to a predetermined tag from an account access request from a secure access system to identify the isolated user account associated with the predetermined tag.

5. The memory card of claim 1, wherein the firmware includes encoded instructions to effect account credential verification in response to an access request from a secured system where the firmware directs the secured system to access an isolated user account based on a tag associated with the isolated user account.

6. The memory card of claim 5, wherein the firmware includes coded instructions to block access to the isolated user account when incorrect account credentials are provided by a user.

7. The memory card of claim 6, wherein the firmware includes coded instructions to block access to the isolated user account when the communication from the secure access system includes an incorrect encryption key.

8. The memory card of claim 7, wherein the memory card is configured to interface with one or more of an aerospace vehicle and a subsystem of the aerospace vehicle.

9. The memory card of claim 7, wherein the memory card is configured to interface with one or more of building facility systems, vehicle systems, personal computers, laptop computers, mobile phones and mobile devices.

10. A method for managing user accounts, the method comprising:
storing multiple isolated user accounts in a memory resident on a memory card where each user account has an associated user account data;
storing one or more stored encryption keys, each of the one or more stored encryption keys corresponding to one of the multiple isolated user accounts;

executing coded instructions of the firmware stored in a permanent portion of the memory to selectively manage each isolated user account;

associating independent firmware components with each of the multiple isolated user accounts within the firmware, each isolated user account employing an encryption type based on the independent firmware component; and enabling access to an account access data for a predetermined isolated user account from the associated user account data when the firmware determines an account credential verification is satisfied, where the firmware interfaces with a secure access system to receive a communication from the secure access system and determines when tag information within the communication from the secure access system that is requesting authentication matches a tag associated with one of the multiple isolated user accounts and further determines when an encryption key within the communication from the secure access system matches the stored encrypted key corresponding to the one of the multiple isolated user accounts.

11. The method of claim 10, further comprising storing the multiple isolated user accounts in a respective partition in the memory and effecting communication with the respective partitions with encryption of the firmware.

12. The method of claim 10, further comprising effecting access to the user account data for a predetermined isolated user account with at least one encryption key of the firmware upon satisfying the predetermined condition.

13. The method of claim 10, further comprising associating each isolated user account with the tag and parsing information related to a predetermined tag from an account access request with the firmware to identify an isolated user account associated with the predetermined tag.

14. The method of claim 10 further comprising effecting account credential verification with coded instructions included in the firmware in response to an access request from a secure system where the firmware directs the secure system to access an isolated user account based on a tag associated with the isolated user account.

15. A multiple account smart card configured to interface with a reader in communication with a secure access system, the multiple account smart card comprising:

a memory resident on the multiple account smart card and having stored thereon multiple isolated user accounts each having an associated user account data; and a firmware stored in a permanent portion of the memory, the firmware including one or more stored encryption keys, each corresponding to one of the multiple isolated user accounts, the firmware further including coded instructions, which when executed, selectively manages each isolated user account so that an account access data for a predetermined isolated user account is accessed from the associated user account data when the firmware determines an account credential verification is satisfied, wherein the firmware includes independent firmware components associated with each of the multiple isolated user accounts, each isolated user account employing an encryption type based on the independent firmware component; and wherein the firmware interfaces with the secure access system and effects account credential verification in response to an access request from the secure access system and directs access by the secure access system to a predetermined isolated user account based on a tag associated with the predetermined isolated user account, where the firmware functions to determine when a tag information within the access request from the secure access system that is requesting authentication matches the tag associated with the predetermined isolated user account, the firmware further functions to determine when an encryption key within the access request from the secure access system matches the stored encryption key corresponding to the predetermined isolated user account.

16. The multiple account smart card of claim 15, wherein each isolated user account resides in a respective partition in the memory and the firmware includes encryption that effects communication between the respective partitions.

* * * * *